US011047799B2

(12) United States Patent
Giacomotti et al.

(10) Patent No.: US 11,047,799 B2
(45) Date of Patent: Jun. 29, 2021

(54) DEVICE AND METHOD FOR PROVIDING ILLUMINATION FOR TOTAL-INTERNAL-REFLECTION FLUORESCENCE MICROSCOPY USING OPAQUE MASK

(71) Applicant: CENTRE NATIONAL DE LA RECHERCHE SCIENTIFIQUE, Paris (FR)

(72) Inventors: Alejandro Giacomotti, Clamart (FR); Maia Brunstein, Bariloche (AR); Andrea Cattoni, Paris (FR); Sophie Bouchoule, Villejuif (FR); Benjamin Damilano, Nice (FR); Denis Lefebvre, Valbonne (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 45 days.

(21) Appl. No.: 16/302,055

(22) PCT Filed: May 23, 2017

(86) PCT No.: PCT/EP2017/062440
§ 371 (c)(1),
(2) Date: Nov. 15, 2018

(87) PCT Pub. No.: WO2017/207360
PCT Pub. Date: Dec. 7, 2017

(65) Prior Publication Data
US 2019/0285547 A1 Sep. 19, 2019

(30) Foreign Application Priority Data
May 31, 2016 (FR) ...................... 1654885

(51) Int. Cl.
*G01N 21/64* (2006.01)
*G02B 21/16* (2006.01)
(Continued)

(52) U.S. Cl.
CPC ....... *G01N 21/6458* (2013.01); *G01N 21/648* (2013.01); *G01Q 60/22* (2013.01); *G02B 21/16* (2013.01); *G02B 27/56* (2013.01)

(58) Field of Classification Search
CPC .. G01N 21/6458; G01N 21/648; G01Q 60/20; G01Q 60/22; G02B 21/0076;
(Continued)

(56) References Cited

U.S. PATENT DOCUMENTS 6,104,857 A * 8/2000 Ishiharada ............... B60Q 1/26
385/123
7,492,978 B2 2/2009 Zourob et al.
(Continued)

FOREIGN PATENT DOCUMENTS

CN 102410996 A 4/2012
EP 1 425 570 A1 6/2004
(Continued)

OTHER PUBLICATIONS

Non-Patent Literature (NPL) Document: "26th International Conference on Plastic Optical Fibres Proceedings" (excerpts from paper _55 "Low Cost Sensitive Liquid Level Monitoring Using Polymer Optical Fibres") (2017) (Year: 2017).*
(Continued)

*Primary Examiner* — Ryan S Dunning
(74) *Attorney, Agent, or Firm* — BakerHostetler

(57) ABSTRACT

A lighting device for total-internal-reflection fluorescence microscopy includes a substrate that is transparent to light, having a refractive index higher than that of water; a light-emitting device arranged in the interior of the sub-
(Continued)

strate, suitable for emitting light radiation in the direction of a surface of the substrate, the light-emitting device being arranged such that at least one portion of the radiation reaches the surface with an angle of incidence larger than or equal to a critical angle of total internal reflection for an interface between the substrate and water; and at least one opaque mask, arranged in the interior or on the surface of the substrate so as to intercept a portion of the radiation that, in the absence of the mask, would reach the surface with an angle of incidence smaller than the critical angle. A lighting device to total-internal-reflection fluorescence microscopy is provided.

15 Claims, 5 Drawing Sheets

(51) Int. Cl.
*G02B 27/56* (2006.01)
*G01Q 60/22* (2010.01)

(58) Field of Classification Search
CPC .. G02B 21/06–16; G02B 21/34; G02B 21/36; G02B 27/56
USPC .................................................. 359/385–390
See application file for complete search history.

(56) References Cited

U.S. PATENT DOCUMENTS

| | | | |
|---|---|---|---|
| 7,545,496 B2 | 6/2009 | Prins et al. | |
| 8,233,953 B2 | 7/2012 | Colvin, Jr. | |
| 8,730,468 B2 | 5/2014 | Messerchmidt | |
| 2002/0026108 A1* | 2/2002 | Colvin, Jr. | G01N 21/648 600/316 |
| 2007/0146717 A1 | 6/2007 | Prins et al. | |
| 2009/0052021 A1 | 2/2009 | Mogami et al. | |
| 2009/0321661 A1 | 12/2009 | Ohtsuka | |
| 2013/0278742 A1 | 10/2013 | Fort et al. | |
| 2014/0104680 A1 | 4/2014 | Berman et al. | |

FOREIGN PATENT DOCUMENTS

| | | |
|---|---|---|
| FR | 2 943 428 A1 | 9/2010 |
| JP | 2000264744 A | 9/2000 |
| JP | 2002523774 A | 7/2002 |
| JP | 2006502382 A | 1/2006 |
| JP | 2008209726 A | 9/2008 |
| JP | 2010008263 A | 1/2010 |
| JP | 2011511292 A | 4/2011 |
| WO | 03/023377 A1 | 3/2003 |
| WO | 2007034796 A | 3/2007 |
| WO | 2011002010 A | 1/2011 |

OTHER PUBLICATIONS

Hassanzadeh et al., "Waveguide evanescent field fluorescence microscopy: Thin film fluorescence intensities and its application in cell biology", Applied Physics Letters 92, 233503 (2008).
Asanov et al., "A novel form of Total Internal Reflection Fluorescence Microscopy (LG-TIRFM) reveals different and independent lipid raft domains in living cells", Biochimica et Biophysica Acta 1801, pp. 147-155, (2010).
Ramachandran et al., "High performance, LED powered, waveguide based total internal reflection microscopy", Scientific reports 3: 2133 (2013).
Balaa, et al., "Surface Plasmon Enhanced TIRF Imaging", Imaging & Microscopy, Oct. 2009.
Japanese OA 2018-562653, dated Feb. 24, 2021, 4 pages.

* cited by examiner

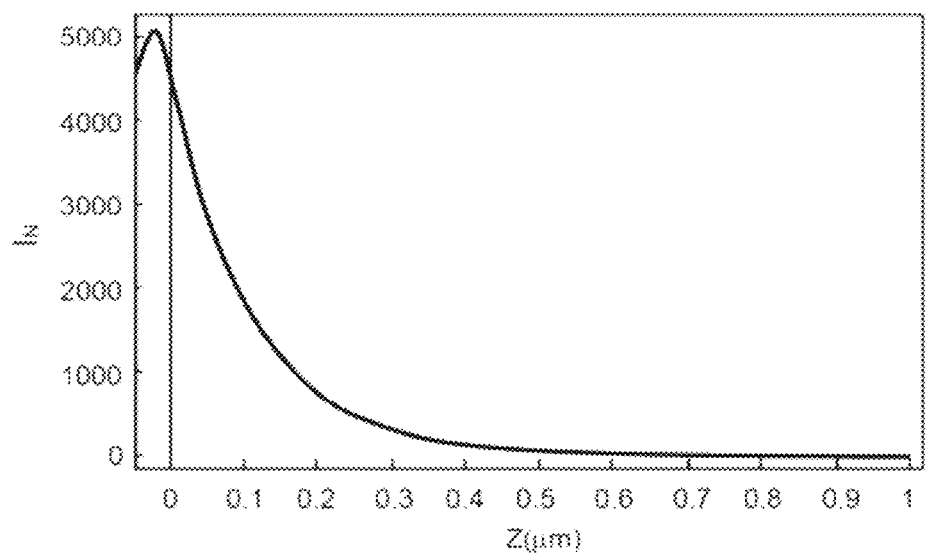
FIG.6C
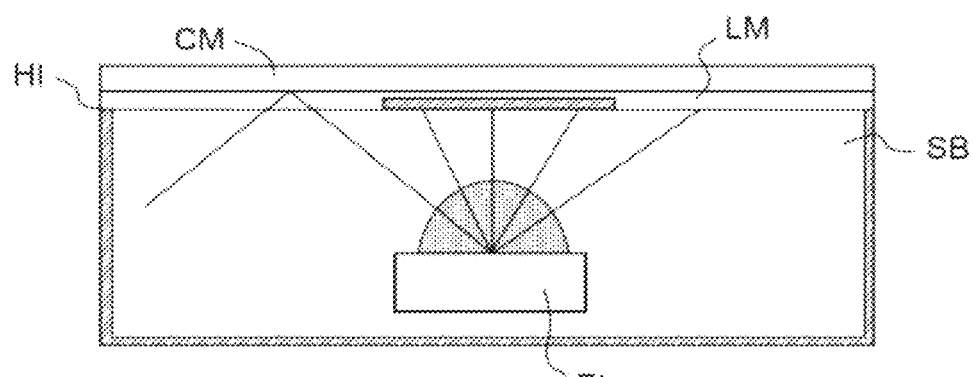
FIG.7
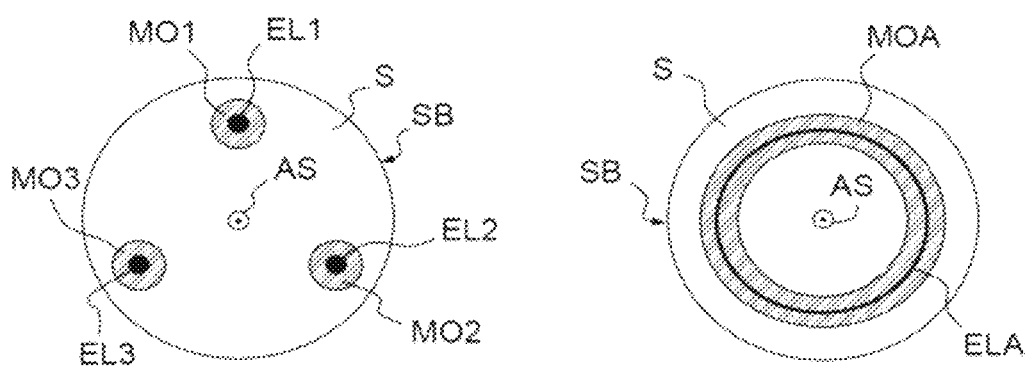
FIG.8A
FIG.8B

DEVICE AND METHOD FOR PROVIDING ILLUMINATION FOR TOTAL-INTERNAL-REFLECTION FLUORESCENCE MICROSCOPY USING OPAQUE MASK

CROSS-REFERENCE TO RELATED APPLICATIONS

This application is a National Stage of International patent application PCT/EP2017/062440, filed on May 23, 2017, which claims priority to foreign French patent application No. FR 1654885, filed on May 31, 2016, the disclosures of which are incorporated by reference in their entirety.

FIELD OF THE INVENTION

The invention relates to a lighting device for total-internal-reflection fluorescence microscopy, and to a total-internal-reflection fluorescence microscopy method using such a device.

BACKGROUND

Total-internal-reflection fluorescence (TIRF) microscopy is a fluorescence microscopy technique in which the excitation of the fluorescent molecules contained in the observed sample is confined to a region of nanoscale thickness located in immediate proximity to the sample-holding slide. It in particular allows structures and processes localized on a cellular membrane to be selectively observed with a spatial resolution in an axial direction that is much higher than the diffraction limit. Furthermore, with respect to more conventional epi-fluorescence techniques, it allows a better contrast to be obtained in the fluorescence image and the effects of photo-bleaching to be decreased.

The basic principle of total-internal-reflection fluorescence microscopy is illustrated in FIG. 1A. The case of a substrate SB of refractive index $n_2$, having a surface S making contact with an ambient medium MA of index $n_1<n_2$, is considered. For example, the substrate SB may consist of a sample-holding slide, or of an element made of glass on which such a slide is placed, whereas the ambient medium MA may be an aqueous solution containing, in suspension, cells marked with fluorophores. A light beam FLI, coming from the substrate SB, is incident on the surface S; its direction of propagation makes, with the normal z to the surface, an angle $\theta$ larger than a critical value $\theta_c$ (critical angle)

$$\theta_c = \arcsin\frac{n_1}{n_2}.$$

Therefore, the beam FLI undergoes total internal reflection (the reference FLR designates the reflected beam) and an evanescent wave OE appears in the ambient medium MA. This evanescent wave has an intensity that decreases exponentially with the distance z from the surface S: $I(z)=I_0 e^{-z/\delta}$, where the penetration length $\delta$ is given by $$\delta = \frac{\lambda}{\sqrt{4\pi(n_2^2 \sin^2\theta - n_1^2)}}.$$

$\lambda$ being the wavelength of the light radiation. The evanescent wave excites the fluorophores contained in the ambient medium, but only over a thickness of about $\delta$, because therebeyond its intensity becomes rapidly negligible. By way of example, for $\lambda=488$ nm, $n_2=1.514$ (BK7 glass), $n_1=1.33$ (water) and $\theta=67°>\theta_c\cong61.45°$, $\delta\cong93$ nm, this meaning that only fluorophores located in a layer of about 100 nm thickness are excited and contribute to the production of a fluorescence image.

FIGS. 1B and 10 illustrate two configurations normally used in TIRF microscopy.

In the case of FIG. 1B, the same microscope objective OBJ, located on the side of the substrate opposite to the medium MA, is used both to generate the evanescent waves by total internal reflection and to collect the fluorescence radiation. The objective is generally of oil-immersion type and may have a high numerical aperture (N.O.), for example of about 1.45, thereby allowing in turn a high lateral spatial resolution (perpendicular to the z-direction) to be obtained because the lateral spatial resolution is given by $d=\lambda/2$N.O. In contrast, such an objective has a very high cost and introduces significant aberrations.

In the case of FIG. 10, a prism PR is used to generate the evanescent waves, and an objective OBJ immersed in the medium MA is used to collect the fluorescence radiation. The objective OBJ of this configuration is of the water-immersion type and generally has a moderate numerical aperture, of about 1.1. With respect to the configuration of FIG. 1B, spatial resolution is lost, but cost and aberrations are decreased. In contrast, the use of a prism makes this configuration more complex and laborious to implement.

A plurality of alternative configurations have been proposed in the scientific literature.

The article by A. Hassanzadeh et al. "*Waveguide evanescent field fluorescence microscopy: Thin film fluorescence intensities and its application in cell biology*" Applied Physics Letters 92, 233503 (2008) describes a configuration in which a planar waveguide is used as sample holder. A light beam emitted by an external source is coupled to the guide by virtue of a diffraction grating. The main drawback of this approach is the complexity of the alignment procedure, which requires the intervention of a specialist operator. A microscope based on this principle cannot therefore be used simply by a biologist without experience in the alignment of optical systems.

The article by A. Asanov et al. "*A novel form of Total Internal Reflection Fluorescence Microscopy (LG-TIRFM) reveals different and independent lipid raft domains in living cells*", Biochimica et Biophysica Acta 1801 (2010), 147-155 discloses a similar assembly having substantially the same advantages and drawbacks, but in which the light is coupled to a planar waveguide serving as sample holder by means of a beam conditioner.

The article by S. Ramachandran et al. "*High performance, LED powered, waveguide based total internal reflection microscopy*", Scientific reports 3: 2133 (2013) discloses the use, as sample holder, of a planar waveguide of disk-shape. Light-emitting diodes (LEDs) arranged around this guide inject light into the latter via its edge face. The main drawback of this approach is its extremely low efficiency. If we consider the case of an LED having an emission cone of aperture equal to 140° located at 3 mm from the edge of the waveguide and of a disk-shaped waveguide of 25 mm diameter and 0.17 mm thickness, and if the fraction of the emitted light that reaches a central region of the disk of 1 mm² area is calculated, the coupling efficiency is found to be about 0.05%. Furthermore, this value is an overestimation because reflection from the entrance face is neglected and the fact that some of the rays that penetrate into the guide do so with a propagation direction that prevents total internal reflection is not considered. Thus, it is necessary to use a plurality of high-power LEDs, which are expensive and cause heating of the substrate, which may prove to be problematic.

SUMMARY OF THE INVENTION

The invention aims to overcome the aforementioned drawbacks of the prior art. More particularly, it aims to provide a lighting device for total-internal-reflection fluorescence microscopy that is both economical and simple to use.

One subject of the invention allowing this aim to be achieved is a lighting device for total-internal-reflection fluorescence microscopy comprising:
- a substrate that is transparent to light in at least one spectral range and that has, in said spectral range, a refractive index higher than that of water;
- at least one light-emitting device arranged in the interior of said substrate, suitable for emitting light radiation in said spectral range in the direction of a surface of the substrate, said light-emitting device being arranged such that at least one portion of said radiation reaches said surface with an angle of incidence larger than or equal to a critical angle of total internal reflection for an interface between said substrate and water; and
- at least one opaque mask, arranged in the interior or on the surface of said substrate so as to intercept a portion of said radiation that, in the absence of said mask, would reach said surface with an angle of incidence smaller than said critical angle.

According to particular embodiments of such a lighting device:

Said or at least one said light-emitting device may have a light emission of directional type, with an emission pattern having a maximum in a direction that is oblique with respect to said surface of the substrate.

The lighting device may comprise a plurality of said light-emitting devices having light emissions of directional type, with emission patterns having maxima in respective directions that are different from one another and that are oblique with respect to said surface of the substrate.

The lighting device may comprise: either a plurality of said light-emitting devices, arranged symmetrically about an axis perpendicular to said surface of the substrate; or a said light-emitting device of ring shape.

The lighting device may comprise a plurality of said light-emitting devices suitable for emitting said light radiation in different portions of said spectral range.

The lighting device may also comprise: a first transparent layer, arranged on the surface of said substrate and having a refractive index lower than that of said substrate, such that at least one portion of the light radiation emitted by said one or more light-emitting devices reaches an interface between the substrate and the first transparent layer with an angle of incidence larger than or equal to a critical angle of total internal reflection for this interface; and a second transparent layer, arranged on the surface of said first transparent layer opposite said substrate and having a refractive index higher than that of said first layer; said first and second layer having thicknesses smaller than at least one wavelength of the light radiation emitted by said one or more light-emitting devices.

The lighting device may also comprise a metal layer deposited on the surface thereof illuminated by said one or more light-emitting devices.

Another subject of the invention is a total-internal-reflection fluorescence microscopy system comprising:
- such a lighting device; and
- a microscope objective arranged to observe a surface of said lighting device, or of a microscope slide placed on said surface, and having an optical axis orthogonal to said surface and shifted with respect to the one or more light-emitting devices of the lighting device.

Yet another subject of the invention is a lighting method for total-internal-reflection fluorescence microscopy comprising steps of:
- placing a substrate that is transparent to light in at least one spectral range in contact with a medium having, in said spectral range, a refractive index lower than that of said substrate;
- activating a light-emitting device arranged in the interior of said transparent substrate so that it emits light radiation in said spectral range in the direction of a surface of the substrate, said light-emitting device being arranged such that at least one portion of said radiation reaches said surface with an angle of incidence larger than or equal to a critical angle of total internal reflection for an interface between said substrate and said optical medium;
- by means of which evanescent waves are generated at the surface of said substrate.

According to particular embodiments of such a method:

At least one opaque mask may be arranged in the interior or on the surface of said substrate so as to intercept a portion of said radiation that, in the absence of said mask, would reach said surface with an angle of incidence smaller than said critical angle.

Said medium may be aqueous.

Said or at least one said light-emitting device may have a light emission of directional type, with an emission pattern having a maximum in a direction that is oblique with respect to said surface of the substrate.

A first transparent layer may be arranged on the surface of said substrate, having a refractive index lower than that of said substrate, such that at least one portion of the light radiation emitted by said one or more light-emitting devices reaches a substrate/first-transparent-layer interface with an angle of incidence larger than or equal to a critical angle of total internal reflection for this interface; and a second transparent layer may be arranged on the surface of said first transparent layer opposite said substrate, having a refractive index higher than that of said first layer; said first and second layer having thicknesses smaller than at least one wavelength of the light radiation emitted by said one or more light-emitting devices.

A metal layer may be arranged on the surface of said substrate or in proximity thereto, such that surface plasmons are excited by said evanescent waves.

A sample containing at least one fluorophore may be brought into contact with the surface of said substrate or into proximity thereto, such that a fluorescent emission of said fluorophore is excited by said evanescent waves, or evanescent waves associated with said surface plasmons, and at least one fluorescence image of said sample may be acquired by means of a microscope objective.

Said one or more light-emitting devices may be arranged such that said evanescent waves have different penetration lengths at various points on the surface of said substrate; said substrate is moved with respect to said sample, a plurality of fluorescence images being acquired for a plurality of various relative positions between the sample and the substrate, such that a given point of the sample is exposed to evanescent waves of different penetration lengths; the method possibly also comprising a step of reconstructing a three-dimensional image of a distribution of the fluorophores in the interior of the sample on the basis of said fluorescence images.

BRIEF DESCRIPTION OF THE DRAWINGS

Other features, details and advantages of the invention will become more clearly apparent on reading the description, which is given with reference to the appended drawings, which are given by way of example and show, respectively:

FIGS. 6A to 6C, a fourth embodiment of the invention;

FIG. 7, a fifth embodiment of the invention;

FIGS. 8A and 8B, two variants of a sixth embodiment of the invention; and

DETAILED DESCRIPTION

Figure 1A:
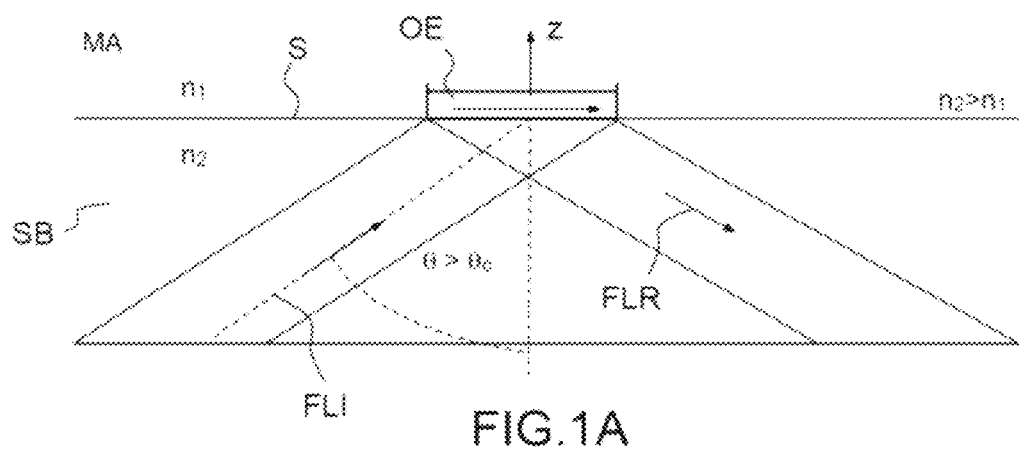
FIGS. 1A to 1O, the total-internal-reflection microscopy technique known from the prior art.
Figure 1B:
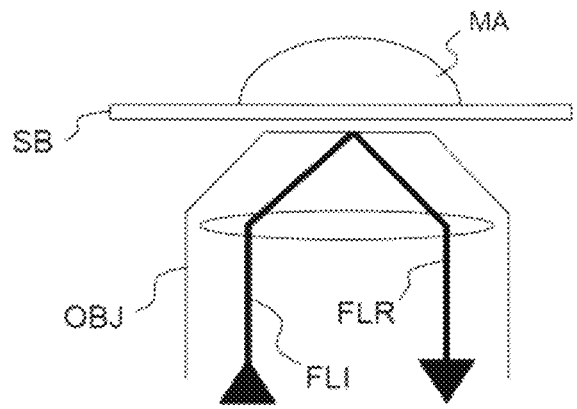
Figure 1C:
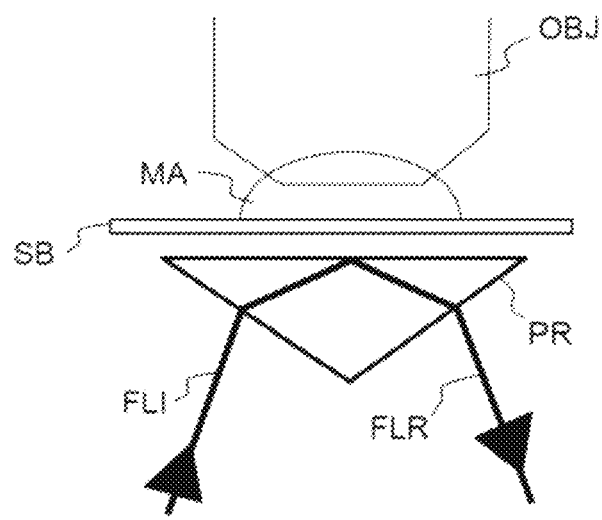
Figure 2:
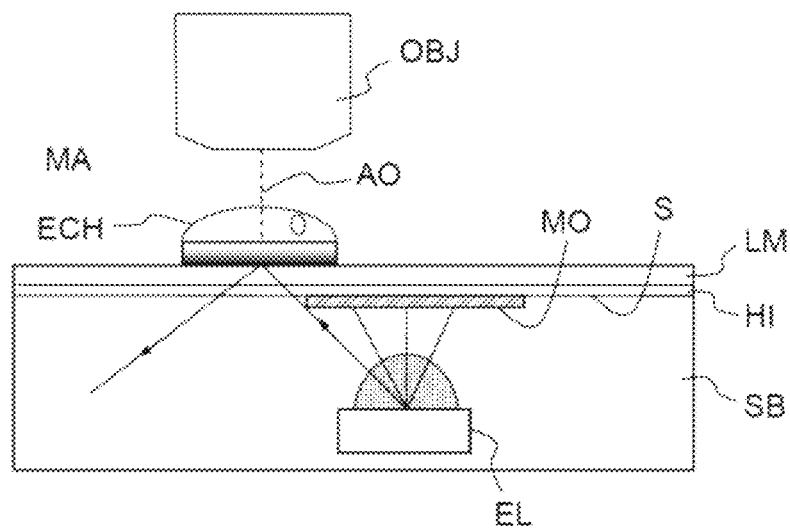
FIGS. 2 and 3A to 3C, a first embodiment of the invention.

The device of FIG. 2 comprises a planar substrate SB made of transparent material—more precisely, transparent to the light in at least one spectral range in the near infrared, the visible or the near ultraviolet—in the interior of which is arranged a light-emitting device EL—typically a semiconductor device such as a light-emitting diode or an end of an optical fiber the opposite end of which is coupled to an external light source. For example, the substrate SB may be made of a polymer, such as PDMS, and be produced by molding, the device EL having been placed beforehand in the mold. The figure does not show the electrical connections of the device EL, which exit from the substrate. In the embodiment in FIG. 2, the device EL has a nondirectional emission, the light intensity emitted in a direction being proportional to the cosine of the angle made between said direction and the normal to the emission surface of the device (Lambert's cosine law). This emission surface is parallel to a surface S of the substrate SB, on which a microscope slide LM, which is for example made of glass, is placed; an immersion oil HI (or any other material allowing the refractive indices to be matched) is advantageously placed between the surface S and the slide LM. The surface of the slide on the side opposite the substrate makes contact with an ambient medium MA, for example an aqueous solution, having a refractive index lower than those of the substrate SB and of the slide LM. As a variant, the substrate SB itself may serve as microscope slide.

An opaque mask MO is arranged in proximity to the surface S (in the interior of the substrate, or on the external side of the surface) directly above the light-emitting device EL, so as to intercept all the light rays emitted by said device and liable to reach the surface S with an angle of incidence smaller than the critical angle. Thus, only rays possessing angles of incidence larger than the critical angle reach the microscope slide LM and undergo total internal reflection at the surface between the latter and the ambient medium MA.

A sample ECH, for example a cell marked with a fluorescent marker (fluorophore), is positioned on the microscope slide, in a position that is off-center with respect to the device EL and to the opaque mask MO. More particularly, the sample is positioned in alignment with a region of the surface of the slide where evanescent waves OE, produced by the total internal reflection of the light radiation emitted by the device EL, are present. In a way known per se, these evanescent waves excite the fluorescence of the fluorophores contained in the sample; a microscope objective OBJ, of the water-immersion type, positioned above the sample with an optical axis OA perpendicular to the surface S, is used to collect the fluorescence radiation and to form an image of the spatial distribution of the fluorophores.

It will be noted that it is not essential for the opaque mask to intercept all the lights rays having an angle of incidence smaller than the critical angle; it is enough for this to occur on a region of the surface S. For example, in the case of FIG. 2, the mask MO may let pass rays of angle of incidence smaller than the critical angle propagating in a direction opposite to that in which the sample and the objective are found. It is however preferable for the mask MO to intercept at least most of the light rays having an angle of incidence smaller than the critical angle, so as to minimize the amount of parasitic light liable to reach the objective.

The assembly formed by the substrate SB, the opaque mask MO and the light-emitting device EL is independent of the sample and the objective, and is therefore easily reusable. Moreover, may be very inexpensive, and its "monolithic" structure avoids having to perform complex alignment operations.

Figure 3A:
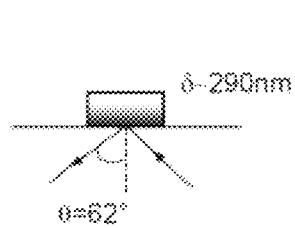
Figure 3B:
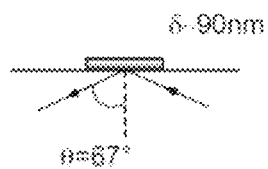
Figure 3C:
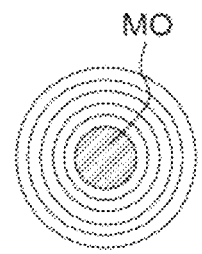

An advantageous feature of the device of FIG. 2 is that the penetration length δ of the evanescent waves OE is not constant over all the surface S, but depends on the angle of incidence of the light rays; it therefore varies depending on the distance with respect to the vertical of the device EL. FIGS. 3A and 3B show that for a wavelength λ=488 nm, assuming a substrate of refractive index equal to 1.514 and an aqueous ambient medium, the penetration depth varies from 290 nm to 90 nm when the angle of incidence passes from 62° to 67°. FIG. 3C shows curves of penetration iso-length forming circles around the opaque mask MO. This is advantageous because it is enough to shift the substrate SB laterally with respect to the microscope slide LM to choose a penetration length suitable for a particular application. It is even possible to acquire a plurality of fluorescence images of a given sample with different penetration lengths. By subtracting these images pairwise, it is possible to reconstruct, in slices, the three-dimensional distribution of fluorophores, and do so with a nanoscale resolution in an axial direction.

Let us consider the case of a nondirectional emitting device EL located 1.8 mm below the surface S of a substrate made of PDMS (refractive index 1.41), on which substrate a microscope slide made of glass of 0.5 mm thickness is placed; the ambient medium is air. Under these conditions, total reflection occurs beyond a circumference of diameter equal to about 4.5 mm, centered on the normal to the surface S passing through the center of the device EL. Evanescent waves are generated in a circular annulus the outside diameter of which reaches 11 mm. In an area of 1 mm² at a horizontal distance of 5 mm from the normal to the surface S passing through the center of the device EL, 0.7% of the total light intensity emitted by the device is collected. This efficiency is higher by more than one order of magnitude s than that achieved using the configuration proposed in the aforementioned article by S. Ramachandran et al. It must nevertheless be admitted that this efficiency is still relatively low; other embodiments of the invention allow it to be improved.

The simplest way of obtaining such a result consists in replacing the nondirectional emitter of FIG. 2 with a directional light-emitting device ELD (for example a superluminescent diode or a semiconductor laser) the emission pattern of which has a maximum in a direction that is inclined with respect to the normal to the surface S, preferably, this direction makes to the normal to the surface S an angle larger than the critical angle. This is illustrated by FIG. 3. In certain cases, if the emission of the ELD device is sufficiently directional, the opaque mask MP may be omitted.

Figure 5:
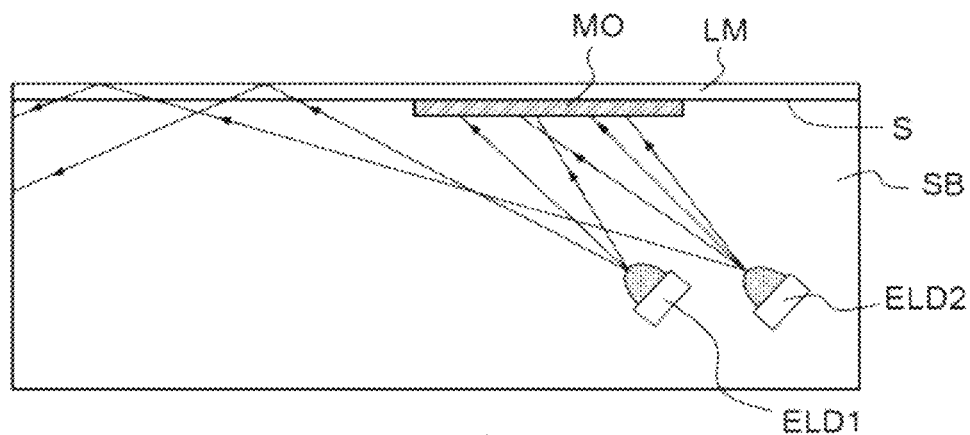
FIG. 5, a third embodiment of the invention.

FIG. 5 illustrates a variant in which a plurality of directional light-emitting devices ELD1, ELD2 are arranged beside each other. These devices have emission patterns having maxima in different directions, so as to define, on the surface S of the substrate, regions characterized by different penetration lengths of the evanescent waves, as was described with reference to FIGS. 3A-3C.

Figure 6A:
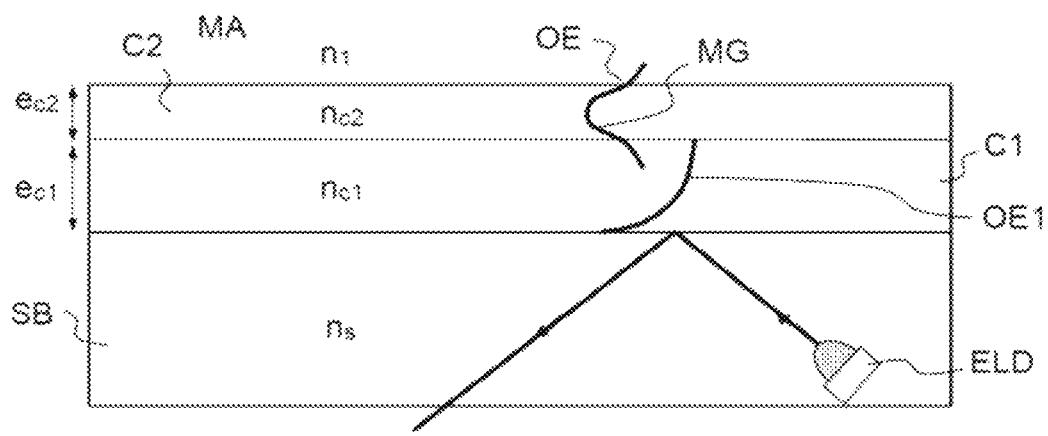

An amplification of the evanescent wave generated in the ambient medium MA may also be obtained by trapping the excitation light radiation in a planar waveguide on the surface of the substrate SB. Such a configuration is illustrated in FIG. 6A. More precisely, a transparent first layer C1, of thickness $e_{c1}$ and refractive index $n_{c1}$, covers the surface S of the substrate SB; a second transparent layer C2 of thickness $e_{c2}$ and refractive index $n_{c2}$ is arranged above the first layer, in contact with the ambient medium. The thicknesses $e_{c1}$ and $e_{c2}$ do not exceed the wavelength of the light radiation emitted by the light-emitting device (not shown) contained in the volume of the substrate. Preferably, the layer C2 makes direct contact with the ambient medium MA and the sample to be observed, without interposition of a microscope slide separate from the substrate.

The refractive index $n_{c1}$ of the first transparent layer is lower than that, $n_s$, of the substrate: $n_{c1}<n_s$; therefore there is a critical angle such that light rays coming from the substrate and reaching its surface S with an angle of incidence larger than this critical angle undergo total internal reflection. Thus, an evanescent wave OE1 is generated in the layer C1.

The refractive index $n_{c2}$ of the second transparent layer is higher both than that of the first transparent layer and than that, $n_1$, of the ambient medium: $n_{c2}>n_{c1}$, $n_{c2}>n_1$. Under these conditions, the second transparent layer forms a planar waveguide. The evanescent wave OE1 generated in the first transparent layer excites a guide mode MG of this guide, this leading to the appearance of an evanescent wave OE in the ambient medium—as in the other embodiments. Numerical simulations allow it to be verified that, for a particular angle of incidence, the intensity of the evanescent wave in the medium MA is increased very substantially (up to three orders of magnitude) with respect to the case of FIG. 2, in which the transparent layers C1 and C2 are not present.

Figure 6B:
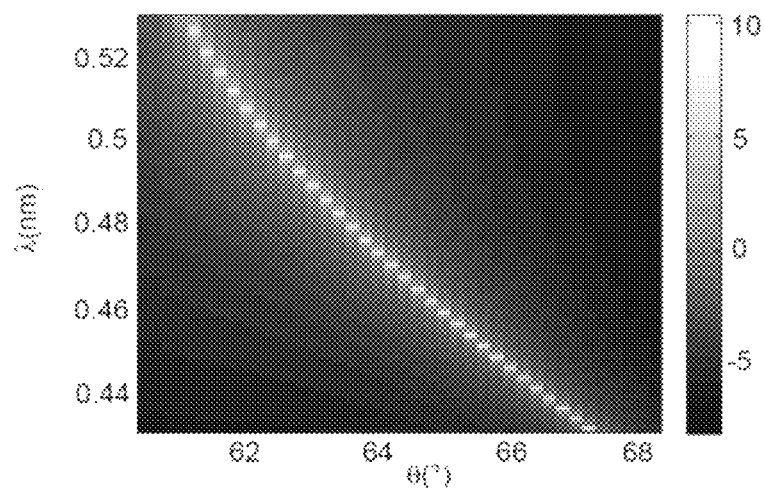

Numerical simulations have been carried out for the case $\lambda=470$ nm, $n_s=1.52$, $n_{c1}=1.23$, $e_{c1}=450$ nm, $n_{c2}=1.7$, $e_{c2}=290$ nm, $n_1=1.33$ (ambient medium consisting of water). FIG. 6B is a graph showing, on a logarithmic scale, the intensity of the evanescent field as a function of the angle of incidence $\theta$ and of the wavelength $\lambda$, for a TE polarization (electric field perpendicular to the plane of incidence). It may be seen that the intensification of the evanescent field occurs only at a set angle of incidence that depends on wavelength. FIG. 6C shows $I_N$, the spatial-intensity profile of the evanescent field normalized (with respect to the incident intensity), as a function of the distance z of the surface of the layer C2, for an optimal angle of incidence, equal to 64.2°. The penetration length is about 110 nm.

Another possibility, illustrated in FIG. 7, consists in depositing a thin metal layer CM (a few nanometers or tens of nanometers) on the surface of the microscope slide LM (case illustrated in the figure) or on the surface S of the substrate, if a separate microscope slide is not present. By opportunely choosing the thickness of the layer CM, the wavelength of the light radiation and its angle of incidence it is possible to generate surface plasmons, which greatly amplify the evanescent waves. This effect was described, in a completely different lighting configuration, in the article by K. Balaa and E. Fort "*Surface Plasmon Enhanced TIRF Imaging*", Imaging & Microscopy—October 2009.

The simple embodiment of FIG. 2 does not allow uniform lighting (and more precisely, a uniform excitation of evanescent waves) to be obtained because the light rays incident on the surface S come from a single direction. As illustrated in FIG. 8A, to obtain more uniform lighting, it is possible to use a plurality of light-emitting devices EL1, EL2, EL3, each provided with a respective opaque mask, MO1, MO2, MO3, arranged symmetrically about an axis perpendicular to the surface S of the substrate. The useful region of the surface S, on which the sample to be observed must be positioned, is located in the vicinity of this axis. It is also possible to use an emitting device ELA of annular shape—for example a made-to-measure light-emitting diode—with an opaque mask MOA in the shape of a circular annulus.

Figure 9:
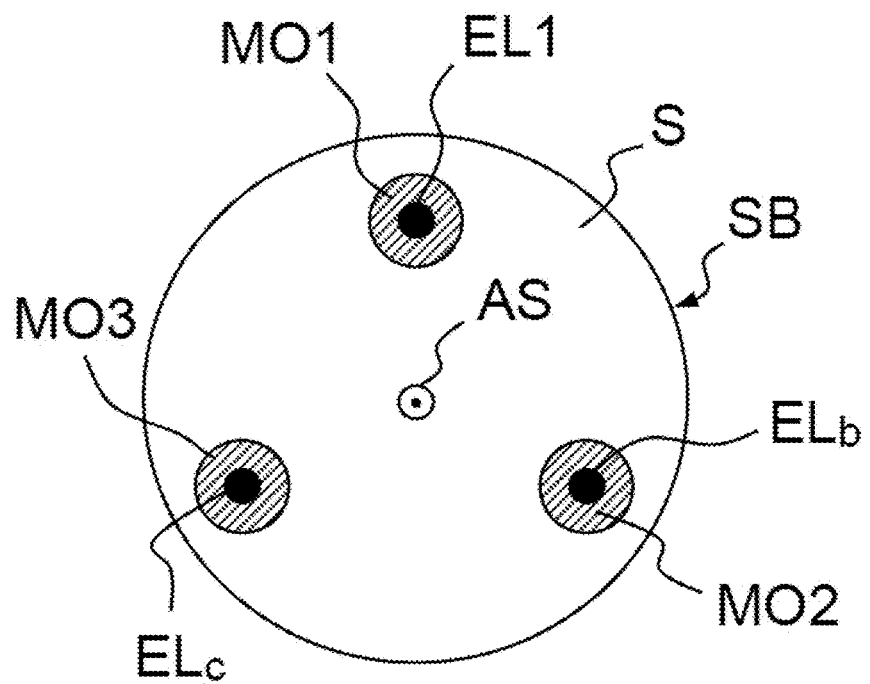
FIG. 9, a seventh embodiment of the invention.

In certain applications, the sample may contain a plurality of types of fluorophore, having different excitation wavelengths. A lighting device according to one embodiment of the invention may then comprise, advantageously, a plurality of light-emitting devices, having different emission wavelengths suitable for exciting the fluorescence of respective fluorophores. These devices may be activated simultaneously or in sequence. FIG. 9 illustrates one embodiment of the invention comprising three of these light-emitting devices ELa, ELb, ELc, arranged symmetrically about an axis AS and each provided with a respective opaque mask MO1, MO2, MO3.

Figure 4:
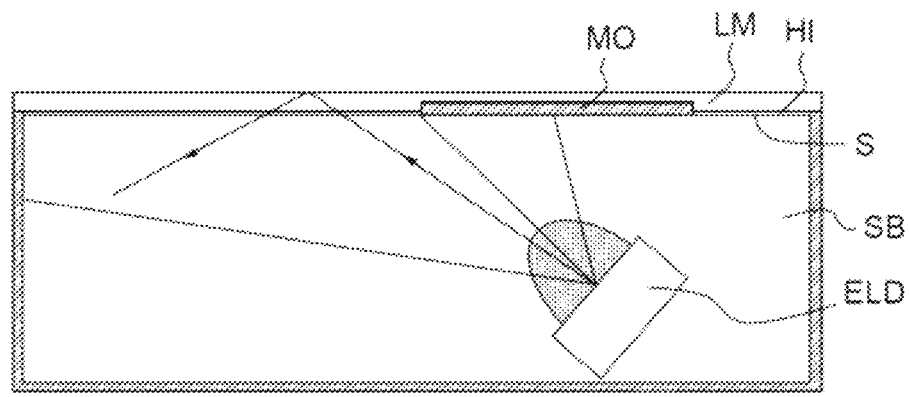
FIG. 4, a second embodiment of the invention.

These various embodiments may be combined together. Thus, for example, it is possible to arrange symmetrically about an axis a plurality of groups of optionally directional emitting devices, each device of one group having a different emission wavelength. Likewise, the use of a waveguide or of a metal layer to amplify the evanescent waves is compatible with the use of directional emitting devices. It is also possible to combine, in the same device, the use of a waveguide (see FIG. 6A) and a metal layer (see FIG. 4).

The invention claimed is:
1. A lighting device for total-internal-reflection fluorescence microscopy, the lighting device comprising:
   a substrate that is transparent to light in at least one spectral range and that has, in said spectral range, a refractive index higher than that of water;
   at least one light-emitting device arranged in the interior of said substrate, suitable for emitting light radiation in said spectral range in the direction of a surface of the substrate, said light-emitting device being arranged such that at least one portion of said radiation reaches said surface with an angle of incidence larger than or equal to a critical angle of total internal reflection for an interface between said substrate and water; and
   at least one opaque mask, arranged in the interior or on the surface of said substrate so as to intercept a portion of said radiation that, in the absence of said mask, would directly reach said surface with an angle of incidence smaller than said critical angle.

2. The device as claimed in claim 1, wherein said or at least one said light-emitting device has a light emission of directional type, with an emission pattern having a maximum in a direction that is oblique with respect to said surface of the substrate.

3. The device as claimed in claim 2, comprising a plurality of said light-emitting devices having light emissions of directional type, with emission patterns having maxima in respective directions that are different from one another and that are oblique with respect to said surface of the substrate.

4. The device as claimed in claim 1, comprising:
either a plurality of said light-emitting devices, arranged symmetrically about an axis perpendicular to said surface of the substrate; or
a said light-emitting device of ring shape.

5. The device as claimed in claim 1, comprising a plurality of said light-emitting devices suitable for emitting said light radiation in different portions of said spectral range.

6. The device as claimed in claim 1, further comprising:
a first transparent layer, arranged on the surface of said substrate and having a refractive index lower than that of said substrate, such that at least one portion of the light radiation emitted by said one or more light-emitting devices reaches an interface between the substrate and the first transparent layer with an angle of incidence larger than or equal to a critical angle of total internal reflection for this interface; and
a second transparent layer, arranged on the surface of said first transparent layer opposite said substrate and having a refractive index higher than that of said first layer;
said first and second layer having thicknesses smaller than at least one wavelength of the light radiation emitted by said one or more light-emitting devices.

7. The device as claimed in claim 1, further comprising a metal layer deposited on the surface thereof illuminated by said one or more light-emitting devices.

8. A total-internal-reflection fluorescence microscopy system comprising:
a lighting device as claimed in claim 1; and
a microscope objective arranged to observe a surface of said lighting device, or of a microscope slide placed on said surface, and having an optical axis orthogonal to said surface and shifted with respect to the one or more light-emitting devices of the lighting device.

9. A lighting method for total-internal-reflection fluorescence microscopy comprising steps of:
placing a substrate that is transparent to light in at least one spectral range in contact with a medium having, in said spectral range, a refractive index lower than that of said substrate;
activating a light-emitting device arranged in the interior of said transparent substrate so that it emits light radiation in said spectral range in the direction of a surface of the substrate, said light-emitting device being arranged such that at least one portion of said radiation reaches said surface with an angle of incidence larger than or equal to a critical angle of total internal reflection for an interface between said substrate and said optical medium;
by means of which evanescent waves are generated at the surface of said substrate;
wherein at least one opaque mask is arranged in the interior or on the surface of said substrate so as to intercept a portion of said radiation that, in the absence of said mask, would directly reach said surface with an angle of incidence smaller than said critical angle.

10. The method as claimed in claim 9, wherein said medium is aqueous.

11. The method as claimed in claim 9, wherein said or at least one said light-emitting device has a light emission of directional type, with an emission pattern having a maximum in a direction that is oblique with respect to said surface of the substrate.

12. The method as claimed in claim 9, wherein:
a first transparent layer is arranged on the surface of said substrate and has a refractive index lower than that of said substrate, such that at least one portion of the light radiation emitted by said one or more light-emitting devices reaches a substrate/first-transparent-layer interface with an angle of incidence larger than or equal to a critical angle of total internal reflection for this interface; and
a second transparent layer is arranged on the surface of said first transparent layer opposite said substrate and has a refractive index higher than that of said first layer;
said first and second layer having thicknesses smaller than at least one wavelength of the light radiation emitted by said one or more light-emitting devices.

13. The method as claimed in claim 9, wherein a metal layer is arranged on the surface of said substrate or in proximity thereto, such that surface plasmons are excited by said evanescent waves.

14. The method as claimed in claim 9, wherein a sample containing at least one fluorophore is brought into contact with the surface of said substrate or into proximity thereto, such that a fluorescent emission of said fluorophore is excited by said evanescent waves, or evanescent waves associated with said surface plasmons, and wherein at least one fluorescence image of said sample is acquired by means of a microscope objective.

15. The method as claimed in claim 14, wherein:
said one or more light-emitting devices are arranged such that said evanescent waves have different penetration lengths at various points on the surface of said substrate;
said substrate is moved with respect to said sample and a plurality of fluorescence images are acquired for a plurality of various relative positions between the sample and the substrate, such that a given point of the sample is exposed to evanescent waves of different penetration lengths; the method also comprising a step of reconstructing a three-dimensional image of a distribution of the fluorophores in the interior of the sample on the basis of said fluorescence images.

* * * * *